Dec. 9, 1941.　　　　M. L. DODGE　　　　2,265,152
ROTARY FISH PACKER
Filed July 12, 1939　　　　4 Sheets-Sheet 1
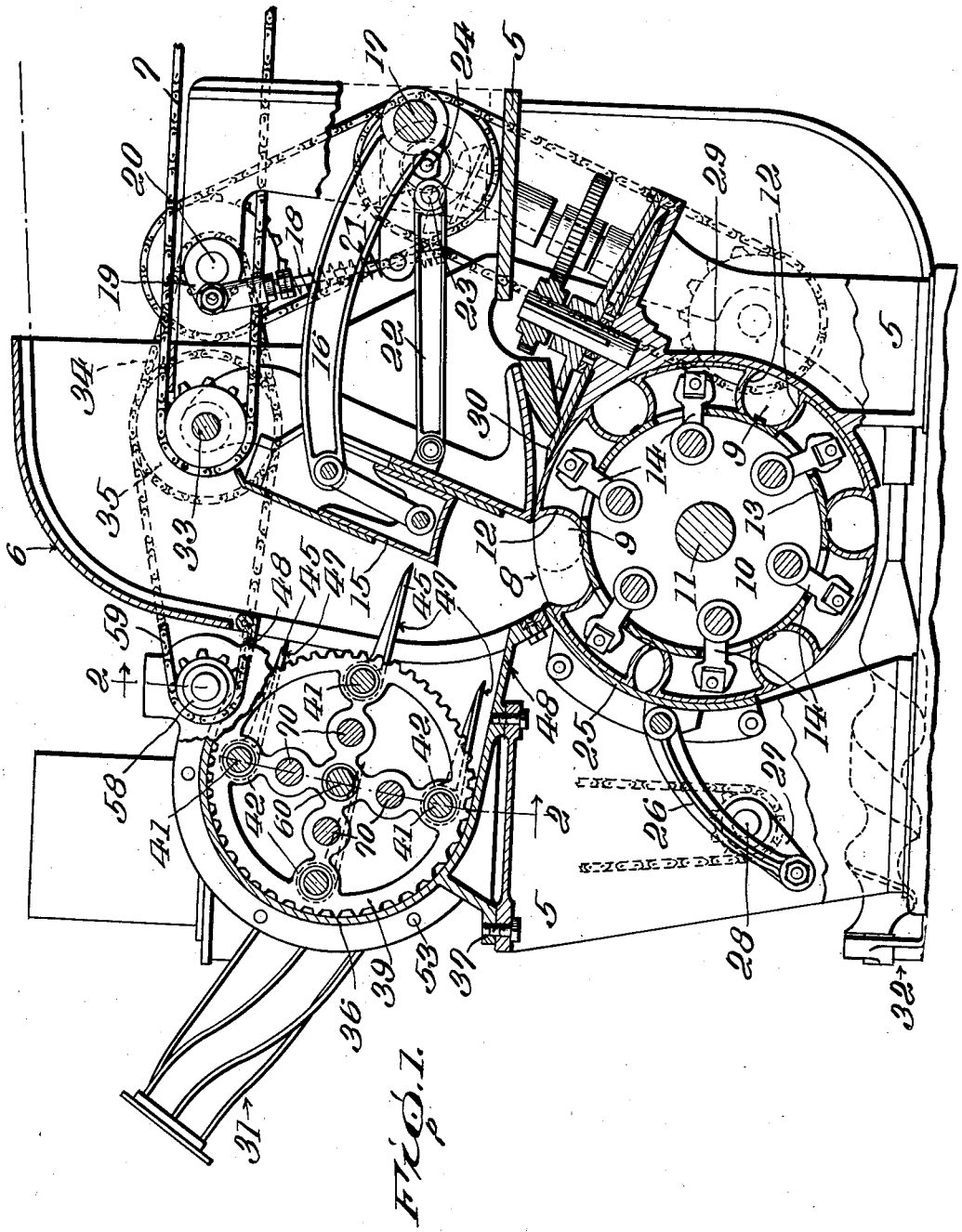
INVENTOR
Merton L. Dodge
Mason & Porter
ATTORNEYS Dec. 9, 1941.    M. L. DODGE    2,265,152
ROTARY FISH PACKER
Filed July 12, 1939    4 Sheets-Sheet 2
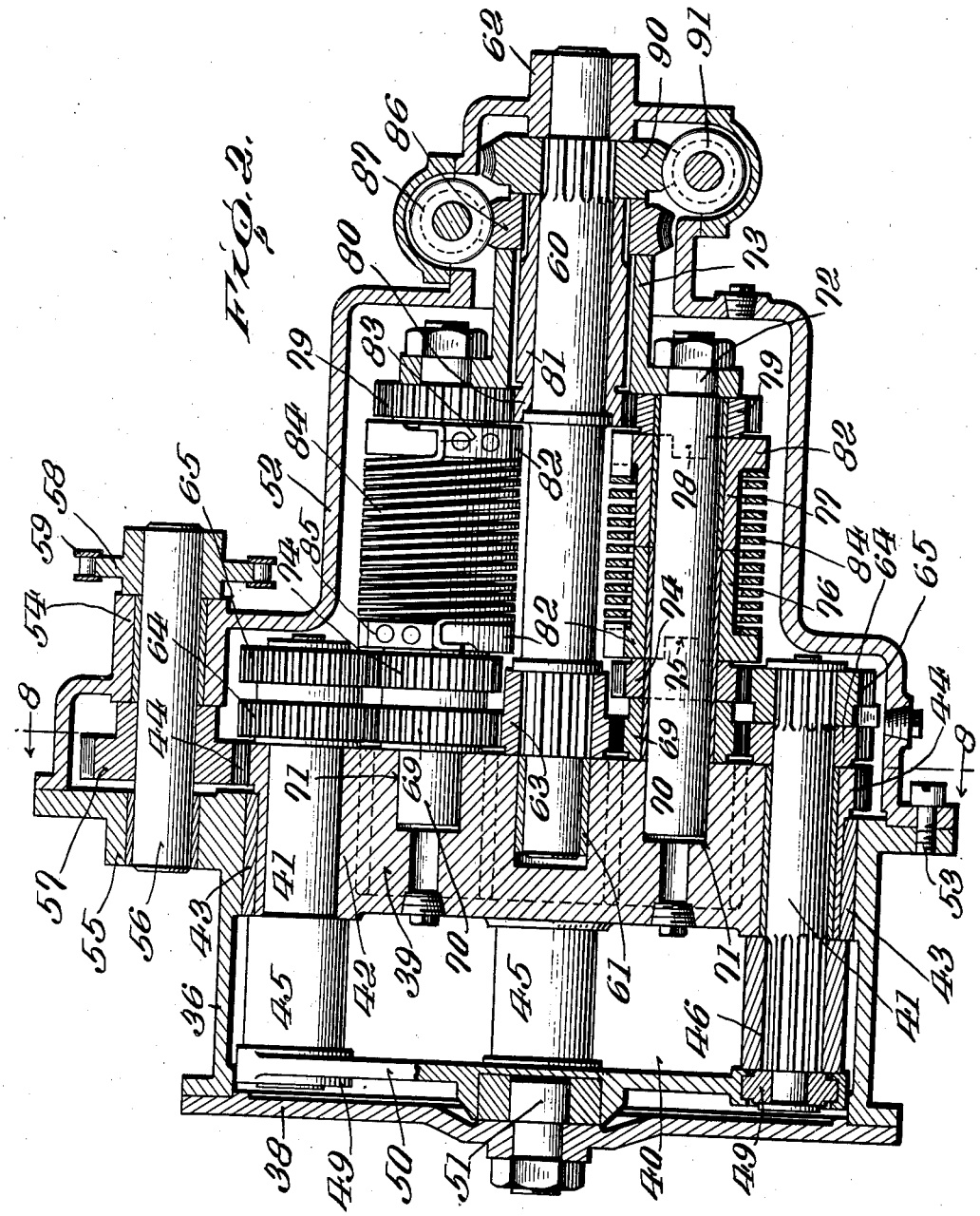
INVENTOR
Merton L. Dodge
By Mason & Porter
ATTORNEYS Dec. 9, 1941.　　　　　M. L. DODGE　　　　　2,265,152
ROTARY FISH PACKER
Filed July 12, 1939　　　　4 Sheets-Sheet 3
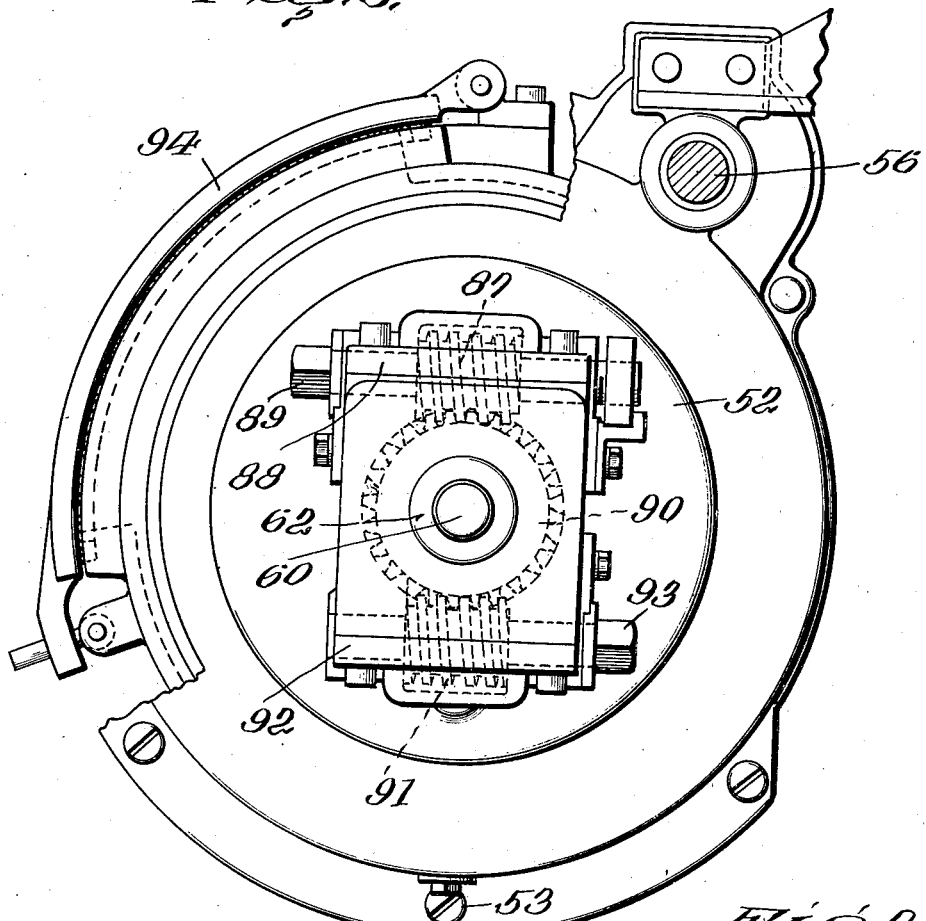
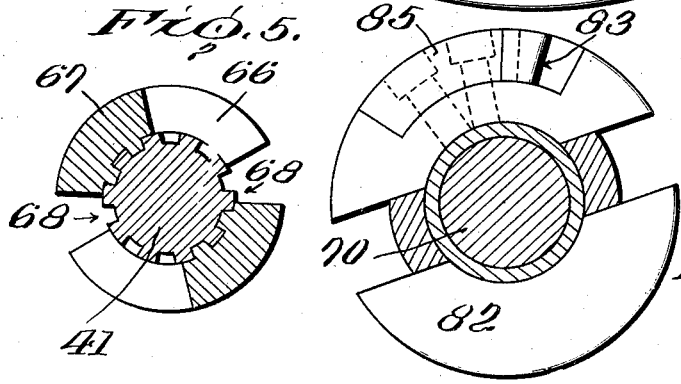
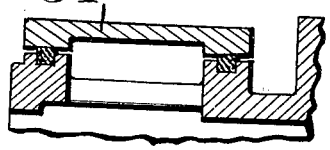
INVENTOR
Merton L. Dodge
Mason & Poiter
ATTORNEYS Dec. 9, 1941.                M. L. DODGE                2,265,152
                          ROTARY FISH PACKER
                        Filed July 12, 1939           4 Sheets-Sheet 4

INVENTOR
Merton L. Dodge
Mason & Porter
ATTORNEYS

Patented Dec. 9, 1941

2,265,152

UNITED STATES PATENT OFFICE 2,265,152

ROTARY FISH PACKER

Merton L. Dodge, Seattle, Wash., assignor to Continental Can Company, Inc., New York, N. Y., a corporation of New York Application July 12, 1939, Serial No. 284,114

18 Claims. (Cl. 226—101)

The invention relates generally to machines for packing foodstuffs, and primarily seeks to provide novel apparatus adapted for use in machines designed for filling cut fish or similar products into the containers in which they are to be marketed.

An example of fish packing apparatus is disclosed in United States Letters Patent 1,891,830, issued to N. C. Nicholson on December 20, 1932, and the present invention is particularly adapted to use in apparatus of this type. In the patented machine, the fish, cut into suitably sized pieces for commercial packaging, is fed into the receiving hopper of the machine wherein a reciprocating and oscillating packer forces the fish into the pockets of a rotating turret. Surplus mass is trimmed from the mouth of each travelling pocket, and each pocketed charge of fish is compacted for convenient transfer from the turret to a receiving container. At a suitable container filling station, the measured and compacted charge of fish is forced from the particular turret pocket into the open end of the container in which that charge of fish is to be marketed, after which the filled container is discharged from the machine. It has been found under some conditions of use of machines of this character that all pockets of the turret are not always adequately and properly filled. One reason for this has been the tendency of the packer to draw large pieces of fish away from the turret during its return stroke of reciprocation. It is the purpose of the present invention to remedy this condition and assure adequate and proper filling of all turret pockets all of the time.

Therefore, in its more detailed nature, the invention has for an object to provide a novel fish packing apparatus for use in packing machines of the type referred to and which includes a plurality of fish mass pressing or feeding paddle members movable into, in and out of the mass of fish being fed toward the turret pockets in a manner assuring that at least one such paddle member will always be exerting a feeding pressure in the mass, thereby avoiding drawing away of fish by the reciprocating packer and assuring perfect filling of all turret pockets.

Another object of the invention is to provide novel means for supporting the paddles and moving them in a circular path without disturbing their constant relation to the direction in which the fish mass is being pressed.

Another object of the invention is to provide novel means for yieldably mounting the paddles so that they can yield to undue resistance met during the feeding of the fish mass and thereby avoid breakage of parts and destructive crushing of fish.

With the above and other objects in view that will hereinafter appear, the nature of the invention will be more fully understood by following the detailed description, the appended claims, and the several views illustrated in the accompanying drawings.

In the drawings:

Figure 1 is a vertical longitudinal section of a fish packing machine embodying the invention.

Figure 2 is a detail vertical cross-section taken on the line 2—2 on Fig. 1.

Figure 3 is a right end elevation illustrating the parts shown in Fig. 2.

Figure 5 is a fragmentary sectional view illustrating the lost motion drive connection between two companion gear elements.

Figure 6 is a fragmentary sectional view illustrating an end connection of one of the spring elements.

Figure 7 is a fragmentary vertical cross-section illustrating the paddle chamber closure door.

Figure 8:
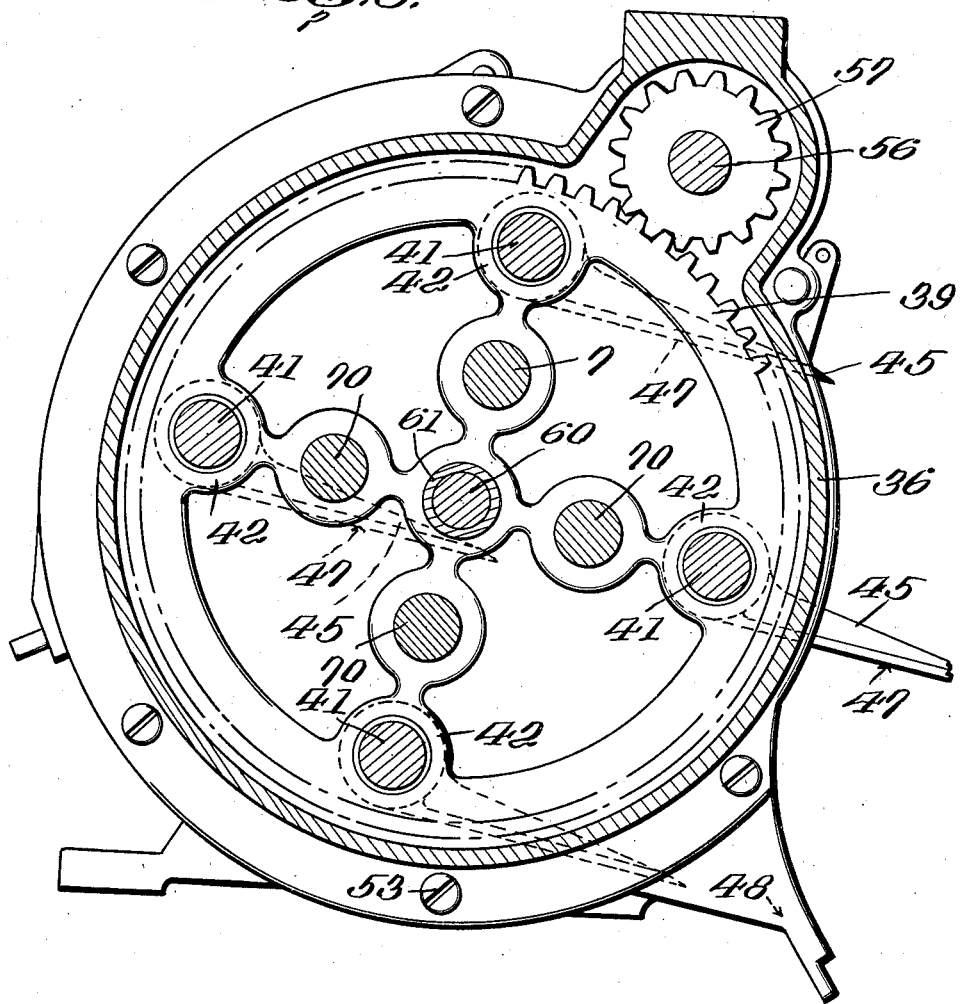
Figure 8 is a fragmentary vertical cross-section taken on the line 8—8 on Fig. 2.
Figure 4:
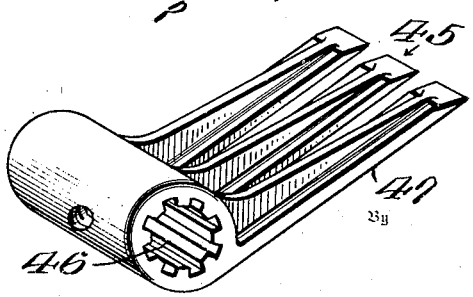
Figure 4 is a detail view illustrating one of the paddles removed from its carrying shaft.

In the drawings, I have illustrated so much of a fish packing machine as is necessary to illustrate the application of the invention. The particular form of machine herein illustrated is disclosed in detail in the United States Letters Patent to Nicholson 1,891,830, issued December 20, 1932. This machine includes a framing generally designated 5 upon which is mounted a hopper structure 6 into which the fish, cut into pieces of suitable size for packaging, is fed by a conveyor 7 from a suitable cutting machine.

The hopper discharge throat 8 delivers downwardly into individual receiving pockets 9 successively presented by a turret 10 secured upon and rotatable with the shaft 11 and in the peripheral portion of which said pockets are formed. The pockets are formed between the concaved ends of spaced, arcuately shaped members 12 which are circumferentially shiftable on the peripheral portion of the turret drum 13 by crank members 14 in order to widely space the opposed concaved portions to form a wide receiving pocket and to thereafter move said faces together to suitably compact the received mass of fish for subsequent insertion into the container in which the fish is to be packaged. See Fig. 1.

The fish is forced from the hopper into the receiving pockets by a packer member 15 which is reciprocated by suitable crank and link connections 16 with a rock shaft 17 to which rocking motion is imparted by a spring loaded arm 18 connected with a crank arm 19 on a rotary shaft 20 and with a crank member 21 secured on the rock shaft 17. Oscillatory motion also is imparted to the packer 15, by a link connection 22 with a crank 23 secured upon a rotary shaft 24, so that it can partake of a measure of movement with the turret portion which it opposes.

In order to prevent expulsion of the fish mass from the receiving pocket during compression thereof in said pocket, a slide plate 25 is movable over the pocket during the interval of compression. The necessary reciprocatory movement is imparted to the slide plate 25 by an operating link 26 connected with a crank member 27 secured upon a rotary shaft 28.

The fish mass compressed into the pockets in the manner stated is held therein by a solid casing sector 29 which confines the pocket masses during the travel of the turret, and just before each pocket reaches the zone of influence of the casing sector 29, surplus fish mass is trimmed off by a rotary knife 30.

Containers for receiving the measured and compacted masses of fish are fed into the machine as at 31 and move onto another turret (not shown) having pockets which register with the pockets of the turret 10 so that the compacted charges of fish can be transferred by plunger structures (not shown) from the turret pockets into the registered containers, the filled containers thereafter being discharged from the machine, as at 32, to be subsequently closed for marketing.

The delivery end of the fish conveyor 7 passes over sprocket equipment on a rotary shaft 33 which is driven by chain and sprocket connections 34 from the rotary shaft 20. The shaft 33 also carries a large sprocket 35, the purpose for which will later become apparent.

All of the parts hereinbefore described, with the exception of the sprocket 35, are disclosed in detail in the Nicholson Patent 1,891,830 hereinbefore referred to, and further detailed description of the construction and operation of these parts herein is deemed unnecessary. The machine parts referred to form no part of the present invention except insofar as they cooperate with the mechanisms hereinafter described.

In the practical development of the invention, there is provided a generally cylindrical casing 36 which is secured as at 37 upon the machine framing. This casing is closed at one end by a removable cover plate 38 and at its other end by a rotor 39, the plate and rotor being disposed in spaced parallel relation to form a paddle or fork chamber 40 between them and within the casing or shell 36.

Into the chamber 40 the inner ends of four shafts 41 are projected, each shaft being rotatably supported in bearings 42 formed in the rotor 39, said rotor being itself rotatable in a bearing 43 provided therefor in the shell 36. The rotor is also provided with a rim gear 44 through which rotation can be imparted to the rotor in a manner later to be described.

The end of each shaft 41 which is projected into the chamber 40 has a paddle or flat tined fork 45 keyed thereto as at 46, the body or tine portions of all of the paddles or forks being directed in a common direction so as to present the sharp ends of the tines toward the fish feeding tunnel formed in the hopper 6 and the lower flat feeding faces 47 thereof all in parallel relation and bearing truly transverse relation to said tunnel, as will be obvious by reference to Fig. 1 of the drawings. Means later to be described is provided for constantly holding the forks in the positions stated as they move about with the rotor 39 into, along with, and out of the fish mass in the tunnel, and these movements of the paddle or fork elements take place through a suitable opening 48 formed in the shell and communicating into said hopper tunnel.

The inwardly extended ends of the shafts 41 may be rigidly supported in bearings 49 provided therefor in a supporting disk 50 which is rotatable about a center stud 51 secured in the cover plate 38.

A drive and adjustment gear housing 52 is secured as at 53 to the portion of the shell 36 in which the rotor 39 is mounted, and this housing includes a bearing portion 54 axially aligned with a bearing portion 55 formed in an extension of the shell 36. The bearing portions 54 and 55 rotatably support a driver shaft 56 having a pinion 57 secured thereon which meshes with and imparts rotation to the rotor rim gear 44. The shaft 56 also carries a sprocket 58 to which rotation is imparted by a chain 59 which passes over said sprocket and the driver sprocket 35 hereinbefore referred to.

A center shaft 60 is supported in a bearing hub 61 formed centrally of the rotor 39 and in the axially aligned bearing hub 62 formed in the housing 52, and this shaft is held stationary by means later to be described.

As has been previously stated, means are provided for holding the shafts 41 against rotation about their axes so as to always present the paddle or fork elements in the definite position hereinbefore described, and means also are provided for enabling the paddle or fork elements to yield to a certain extent should they encounter undue resistance to movement in the fish mass. These mechanisms will now be described.

A pinion 63 is keyed to the stationary center shaft 60. Each shaft 41 carries a pinion 64 of the same size as the pinion 63 and which is freely rotatable about the respective shaft 41. Each shaft 41 also has a pinion 65 keyed thereon and which is of the same size as the pinion 64. Each cooperating set of pinions 64 and 65 includes interengaging lug sectors best shown in Fig. 5 of the drawings and which connect the pinions for rotation together but are so spaced as to permit approximately 60° of rotation of one pinion relative to the other. The lugs projecting from each pinion 64 are designated 66, those projecting from the pinion 65 are designated 67, and the free space permitting the lost motion referred to is indicated at 68.

An idler gear 69 of the same size as each of the pinions referred to is interposed between and meshes with each pinion 64 and the adjacent portion of the fixed pinion 63, and each such idler is carried by a stub shaft 70 supported as at 71 in the rotor 39 and at 72 in a sleeve 73 supported for rotation about the center shaft 60.

An idler pinion 74 of the same size as the pinions previously referred to is carried by each shaft 70 and meshes with the adjacent pinion 65 secured to the end of the respective shaft 41. Each idler pinion 74 has driving lug and recess connection as at 75 with a sleeve member 76 freely rotatable about the respective stub shafts 70 and having its end portion freely abutting the end portion of a like sleeve 77 drive lug and recess connected in similar manner, as at 78, with an idler pinion 79 of the same size as those previously referred to and which meshes with a pinion 80 secured on an adjuster sleeve 81 surrounded by the sleeve 73.

It will be observed by reference to Figs. 2 and 6 of the drawings that the abutting sleeves 76, 77 have end flanges 82 disposed in longitudinally spaced relation and to which the ends 83 of coiled springs 84 are secured by removable keeper sectors 85.

A worm wheel 86 is secured upon the sleeve 81 and is engaged by a worm 87 having suitable bearing as at 88 in the housing 52 and which includes a squared end 89 extended without the housing and by which the worm can be turned for simultaneously adjusting the sleeves 77 relative to the sleeves 76 which they abut for the purpose of adjusting the tension stored in the springs 84.

A worm wheel 90 is secured upon the center shaft 60 and is engaged by a worm 91 having suitable bearing as at 92 in the housing 52 and including an extended squared end 93 by which adjustment of the worm can be effected for imparting partial rotation to the shaft 60. It will be obvious that by imparting partial rotation to the shaft 60, the pinion 63 will be turned and will act through the trains of intermeshing pinions 69, 64 and 65 to partially and simultaneously rotate the several shafts 41 about their axes to alter the direction of projection of the paddle or fork elements without changing their relation one to another.

A hingedly mounted door 94 seals an opening in the casing or shell 36, and through this door access may be had to the casing chamber 40 so that it can be thoroughly flushed out and cleaned.

When the packing machine is in operation, the individual feeding forks or paddles are moved in a circular path and are successively moved into, along with, and then out of the mass of cut fish in the hopper tunnel. As has been previously stated, the gear trains serve to constantly hold the blades in the direction of projection illustrated in Fig. 1 of the drawings, and the relation of the fish feeding fork or paddle members is such that at least one thereof is always in feeding contact with the mass of cut fish in the hopper tunnel. The fork or paddle elements thus cooperate with the reciprocating packer 15 and overcome any tendency of the packer to draw away large cut fish portions during retraction of the packer, which drawing away would be likely to cause partial filling of a turret pocket. By applying constant pressure on the mass of fish in the hopper tunnel, by at least one of the fork or paddle elements, complete filling of all turret pockets is assured.

It is possible that at times a feeding paddle or fork element might meet undue resistance to feeding movement in the fish mass, and should this occur, each such element is free to yield to an extent of approximately 60° in the manner hereinbefore described by backward rotation of the respective gear trains 65, 74, and the innermost one 76 of the abutting sleeves, against the tension of the respective spring 84.

It is of course to be understood that the details of structure and arrangement of parts may be variously changed and modified without departing from the spirit and scope of my invention.

I claim:

1. In a fish packing machine, the combination of a travelling pocketed receiving carrier, a hopper providing a feeding tunnel disposed for directing a fish mass toward said carrier, a reciprocating packer movable rectilinearly toward and from said carrier in said tunnel for pushing the fish mass toward said carrier, and means cooperating with said packer and movable into and out of the fish mass for applying continuous pressure on said fish mass in said tunnel in a direction toward said carrier.

2. In a fish packing machine, the combination of a travelling pocketed receiving carrier, a hopper providing a feeding tunnel leading to said carrier, a packer reciprocable in said tunnel in the direction of feeding movement of fish in the tunnel for pushing fish toward said carrier, a plurality of paddle members disposed across the tunnel from said reciprocating packer, and means for moving the paddles successively into a fish mass in the tunnel, then along with the mass to feed it toward the carrier as the packer is retracted from its stroke toward the carrier, and then out of the mass, said paddles being disposed relatively to said paddle moving means whereby one of said paddles will always be moving in said mass toward said carrier so as to continuously apply pressure in said mass toward said carrier.

3. In a fish packing machine, the combination of a travelling pocketed receiving carrier, a hopper providing a feeding tunnel leading to said carrier, a reciprocating packer in said tunnel for pushing fish toward said carrier, a paddle member movable into a fish mass in the tunnel, then along with the mass to feed it toward the carrier as the packer moves away from the carrier, and then out of the mass, and means for constantly maintaining said paddle in a position transverse to the direction of feeding movement of the fish mass.

4. In a fish packing machine, the combination of a travelling pocketed receiving carrier, a hopper providing a feeding tunnel leading to said carrier, a reciprocating packer in said tunnel for pushing fish toward said carrier, a paddle member movable into a fish mass in the tunnel, then along with the mass to feed it toward the carrier as the packer moves away from the carrier, and then out of the mass, means for constantly maintaining said paddle in a position transverse to the direction of the feeding movement of the fish mass, and means permitting the paddle to yield backwardly when its progress is unduly resisted in the fish mass.

5. In a fish packing machine, the combination of a travelling pocketed receiving carrier, a hopper providing a feeding tunnel leading to said carrier, a reciprocating packer in said tunnel for pushing fish toward said carrier, means cooperating with said packer for applying continuous pressure on a fish mass in said tunnel in a direction toward said carrier, said last-named means comprising a rotor, a plurality of paddles carried on and rotatable with the rotor, and means for constantly holding the paddles projected toward the tunnel whereby each paddle will enter a fish mass in the tunnel, then move along with and feed the mass and then move out of said mass with at least one such paddle always active during a movement of retraction of said packer.

6. In a fish packing machine, the combination of a travelling pocketed receiving carrier, a hopper providing a feeding tunnel leading to said carrier, a reciprocating packer in said tunnel for pushing fish toward said carrier, means cooperating with said packer for applying continuous pressure on a fish mass in said tunnel in a direction towards said carrier, said last-named means comprising a rotor, a plurality of shafts equidistantly spaced about the axis of and rotatably supported by said rotor, a paddle member secured on and extending toward the hopper from each shaft, and means for holding each shaft against rotation about its axis while the rotor is rotating whereby each paddle will enter a fish mass in the tunnel, then move along with and feed the mass and then move out of said mass with at least one such paddle always active during a movement of retraction of said packer.

7. In a fish packing machine, the combination of a travelling pocketed receiving carrier, a hopper providing a feeding tunnel leading to said carrier, a reciprocating packer in said tunnel for pushing fish toward said carrier, a paddle member movable into a fish mass in the tunnel, then along with the mass to feed it toward the carrier as the packer moves away from the carrier, and then out of the mass, and means including an epicyclic gear train for constantly maintaining said paddle in a position transverse to the direction of feeding movement of the fish mass.

8. In a fish packing machine, the combination of a travelling pocketed receiving carrier, a hopper providing a feeding tunnel leading to said carrier, a reciprocating packer in said tunnel for pushing fish toward said carrier, means cooperating with said packer for applying continuous pressure on a fish mass in said tunnel in a direction toward said carrier, said last-named means comprising a rotor, a plurality of shafts equidistantly spaced about the axis of and rotatably supported by said rotor, a paddle member secured on and extending through the hopper from each shaft, and means including an epicyclic gear train for holding each shaft against rotation about its axis while the rotor is rotating whereby each paddle will enter a fish mass in the tunnel, then move along with and feed the mass and then move out of said mass with at least one such paddle always active during a movement of retraction of said packer.

9. In a fish packing machine, the combination of a travelling pocketed receiving carrier, a hopper providing a feeding tunnel leading to said carrier, a reciprocating packer in said tunnel for pushing fish toward said carrier, means cooperating with said packer for applying continuous pressure on a fish mass in said tunnel in a direction toward said carrier, said last-named means comprising a rotor, a plurality of shafts equidistantly spaced about the axis of and rotatably supported by said rotor, a paddle member secured on and extending through the hopper from each shaft, means including an epicyclic gear train for holding each shaft against rotation about its axis while the rotor is rotating whereby each paddle will enter a fish mass in the tunnel, then move along with and feed the mass and then move out of said mass with at least one such paddle always active during a movement of retraction of said packer, and means for adjusting a gear of said train for altering the direction of projection of said paddle members.

10. In a fish packing machine, the combination of a travelling pocketed receiving carrier, a hopper providing a feeding tunnel leading to said carrier, a reciprocating packer in said tunnel for pushing fish toward said carrier, a paddle member movable into a fish mass in the tunnel, then along with the mass to feed it toward the carrier as the packer moves away from the carrier, and then out of the mass, means for constantly maintaining said paddle in a position transverse to the direction of feeding movement of the fish mass, means including a spring for permitting the paddle to yield backwardly when its progress is unduly resisted in the fish mass, and means for varying the resistance effect of said spring.

11. In a fish packing machine, the combination of a travelling pocketed receiving carrier, a hopper providing a feeding tunnel leading to said carrier, a reciprocating packer in said tunnel for pushing fish toward said carrier, means cooperating with said packer for applying continuous pressure on a fish mass in said tunnel in a direction toward said carrier, said last-named means comprising a rotor, a plurality of paddles carried on and rotatable with the rotor, means for constantly holding the paddles projected toward the tunnel whereby each paddle will enter a fish mass in the tunnel, then move along with and feed the mass and then move out of said mass with at least one such paddle always active during a movement of retraction of said packer, means including a spring associated with each paddle for permitting backward yielding thereof when its progress is unduly resisted in the fish mass, and means for simultaneously adjusting the resistance effect of all said springs.

12. In fish packing apparatus, a hopper providing a tunnel along which a mass of fish is to be moved, means for applying constant moving pressure to a mass of fish in said tunnel comprising a rotor, a plurality of shafts equidistantly spaced about the axis of and rotatably supported by said rotor, a paddle member secured on and extending toward and transversely with respect to said tunnel, a stationary gear, an intermeshing gear set associated with each shaft and meshing with and movable about the stationary gear, said gears being proportioned to constantly hold the paddle members presented in the defined position during rotation of the rotor, and worm and wheel means for holding the stationary gear against rotation and for adjusting its position to effect changes in the direction of projection of said paddle members.

13. In fish packing apparatus, a hopper providing a tunnel along which a mass of fish is to be moved, means for applying constant moving pressure to a mass of fish in said tunnel comprising a rotor, a plurality of shafts equidistantly spaced about the axis of and rotatably supported by said rotor, a paddle member secured on and extending toward and transversely with respect to said tunnel, a stationary gear, a gear on each shaft, an idler gear meshing with each shaft borne gear and with the stationary gear, a lost motion connection between each shaft and the gear which it carries enabling a degree of backward movement of the respective shaft and paddle member, and spring means yieldably taking up said lost motion.

14. In fish packing apparatus, a hopper providing a tunnel along which a mass of fish is to be moved, means for applying constant moving pressure to a mass of fish in said tunnel comprising a rotor, a plurality of shafts equidistantly spaced about the axis of and rotatably supported by said rotor, a paddle member secured on and extending toward and transversely with respect to said tunnel, a stationary gear, a gear on each shaft, an idler gear meshing with each shaft borne gear and with the stationary gear, a lost motion connection between each shaft and the gear which it carries enabling a degree of backward movement of the respective shaft and paddle member, spring means yieldably taking up said lost motion, and means for adjusting the effective resistance of said spring means.

15. In fish packing apparatus, a hopper providing a tunnel along which a mass of fish is to be moved, means for applying constant moving pressure to a mass of fish in said tunnel comprising a rotor, a plurality of shafts equidistantly spaced about the axis of and rotatably supported by said rotor, a paddle member secured on and extending toward and transversely with respect to said tunnel, a stationary gear, a gear freely rotatable on each shaft, an idler gear meshing with each shaft borne gear and with the stationary gear, a gear fixed on each shaft and having a lost motion connection with the other gear on the respective shaft to enable a degree of backward movement of said respective shaft, a gear coaxial with each idler gear and meshing with the respective fixed shaft borne gear, a pair of opposed independently movable rotors associated with each said coaxial gear, one thereof being secured to the respective coaxial gear, means for anchoring the remaining ones of the opposed rotors, and a coiled spring having an end anchored to each rotor of each pair of opposed rotors for the purpose described.

16. In fish packing apparatus, a hopper providing a tunnel along which a mass of fish is to be moved, means for applying constant moving pressure to a mass of fish in said tunnel comprising a rotor, a plurality of shafts equidistantly spaced about the axis of and rotatably supported by said rotor, a paddle member secured on and extending toward and transversely with respect to said tunnel, a stationary gear, a gear freely rotatable on each shaft, an idler gear meshing with each shaft borne gear and with the stationary gear, a gear fixed on each shaft and having a lost motion connection with the other gear on the respective shaft to enable a degree of backward movement of said respective shaft, a gear coaxial with each idler gear and meshing with the respective fixed shaft borne gear, a pair of opposed independently movable rotors associated with each said coaxial gear, one thereof being secured to the respective coaxial gear, means for anchoring the remaining ones of the opposed rotors, a coiled spring having an end anchored to each rotor of each pair of opposed rotors for the purpose described, and means for adjusting the relative positions of the opposed rotors for varying the effective resistance of the coiled springs.

17. In fish packing apparatus, a hopper providing a tunnel along which a mass of fish is to be moved, means for applying constant moving pressure to a mass of fish in said tunnel comprising a rotor, a plurality of shafts equidistantly spaced about the axis of and rotatably supported by said rotor, a paddle member secured on and extending toward and transversely with respect to said tunnel, a stationary gear, a gear freely rotatable on each shaft, an idler gear meshing with each shaft borne gear and with the stationary gear, a gear fixed on each shaft and having a lost motion connection with the other gear on the respective shaft to enable a degree of backward movement of said respective shaft, a gear coaxial with each idler gear and meshing with the respective fixed shaft borne gear, a pair of opposed independently movable rotors associated with each said coaxial gear, one thereof being secured to the respective coaxial gear, means for anchoring the remaining ones of the opposed rotors, a coiled spring having an end anchored to each rotor of each pair of opposed rotors for the purpose described, and means including a worm and wheel equipment for simultaneously adjusting the relative positions of all of the opposed rotors for varying the effective resistance of the coiled springs.

18. In fish packing apparatus, a hopper providing a tunnel along which a mass of fish is to be moved, means for applying constant moving pressure to a mass of fish in said tunnel comprising a rotor, a plurality of shafts equidistantly spaced about the axis of and rotatably supported by said rotor, a paddle member secured on and extending toward and transversely with respect to said tunnel, a stationary gear, a gear freely rotatable on each shaft, an idler gear meshing with each shaft borne gear and with the stationary gear, a gear fixed on each shaft and having a lost motion connection with the other gear on the respective shaft to enable a degree of backward movement of said respective shaft, a gear coaxial with each idler gear and meshing with the respective fixed shaft borne gear, a pair of opposed independently movable rotors associated with each said coaxial gear, one thereof being secured to the respective coaxial gear, means for anchoring the remaining ones of the opposed rotors, a coiled spring having an end anchored to each rotor of each pair of opposed rotors for the purpose described, means including a worm and wheel equipment for simultaneously adjusting the relative positions of all of the opposed rotors for varying the effective resistance of the coiled springs, and means including a worm and wheel equipment for adjusting the position of the stationary gear for altering the directions of projection of the paddle members.

MERTON L. DODGE.